W. H. RICE, DEC'D.
J. E. RICE, ADMINISTRATOR.
MACHINE FOR DIGGING PEANUTS, POTATOES, AND THE LIKE.
APPLICATION FILED FEB. 23, 1909.
1,131,419.
Patented Mar. 9, 1915.
2 SHEETS—SHEET 1.
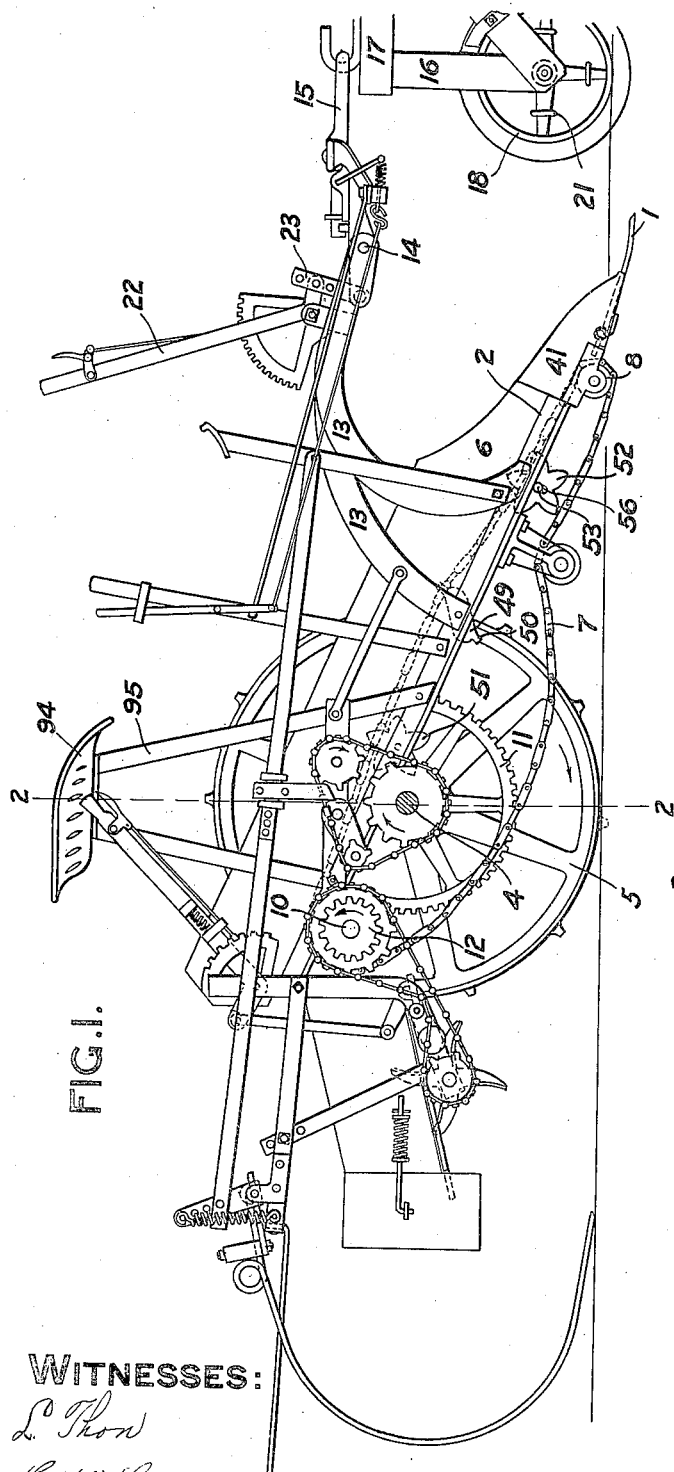
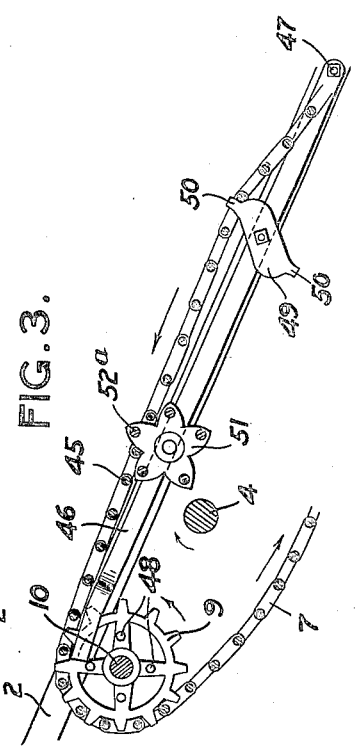
WITNESSES:
L. Thon
C. W. Carroll
INVENTOR:
William H. Rice W. H. RICE, DEC'D.
J. E. RICE, ADMINISTRATOR.
MACHINE FOR DIGGING PEANUTS, POTATOES, AND THE LIKE.
APPLICATION FILED FEB. 23, 1909.
1,131,419.   Patented Mar. 9, 1915.
2 SHEETS—SHEET 2.
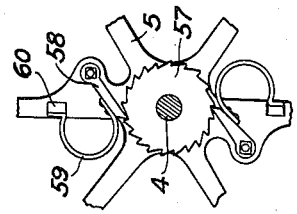
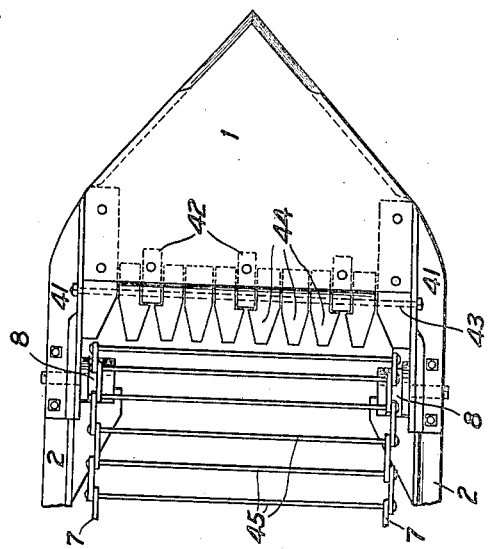
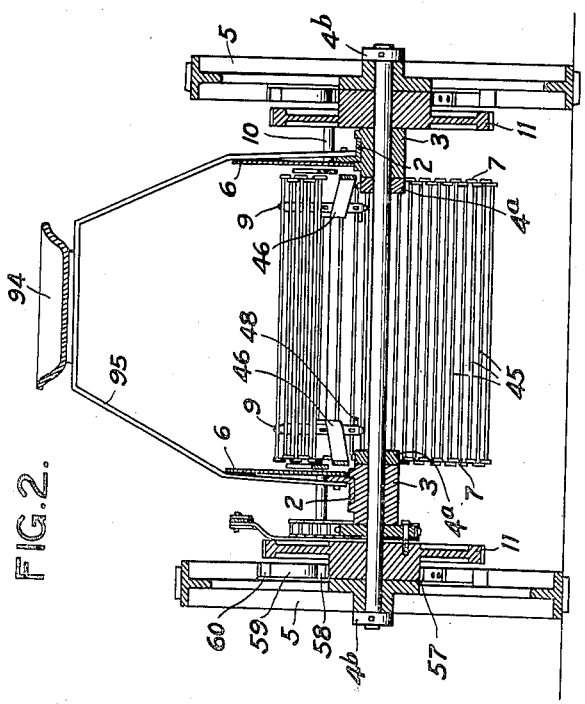
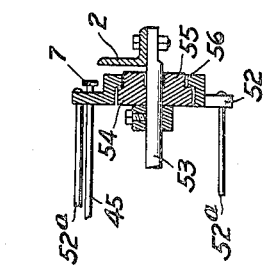
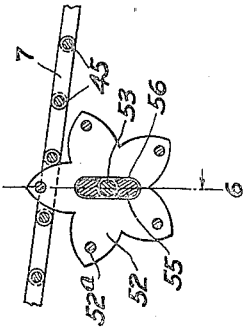
WITNESSES:
L. Thon
C. W. Carroll
INVENTOR:
William H. Rice
by his attorneys
Osgood, Davis & Dorsey

UNITED STATES PATENT OFFICE.

WILLIAM H. RICE, OF ROCHESTER, NEW YORK; JOHN E. RICE ADMINISTRATOR OF SAID WILLIAM H. RICE, DECEASED.

MACHINE FOR DIGGING PEANUTS, POTATOES, AND THE LIKE.

1,131,419.     Specification of Letters Patent.     Patented Mar. 9, 1915.

Application filed February 23, 1909. Serial No. 479,632.

*To all whom it may concern:*

Be it known that I, WILLIAM H. RICE, a citizen of the United States, and resident of Rochester, in the county of Monroe and State of New York, have invented certain new and useful Improvements in Machines for Digging Peanuts, Potatoes, and the like, of which the following is a specification.

This invention relates to machines for digging peanuts, potatoes, and the like.

Its object is the production of an apparatus that is adapted thoroughly to separate earth, stones, &c., from the vines, potatoes, &c.

The invention consists in the apparatus hereinafter described and claimed.

In the drawings: Figure 1 is a side elevation of the machine, with one drive-wheel and its attached gear wheel removed; Fig. 2 is a cross-section on the line 2—2 of Fig. 1; Fig. 3 is a partial longitudinal section, on an enlarged scale; Fig. 4 is a side elevation of one driving ratchet; Fig. 5 is an enlarged side elevation of a conveyer-agitating wheel; Fig. 6 is a section on the line 6—6 of Fig. 5; Fig. 7 is a plan of the plow.

The digging machine comprises a sharp-edged plow 1, that is supported on the front ends of inclined side-frames 2. The latter are fixed to bearings 3 through which extends the main shaft 4, having on its ends the driving or ground-wheels 5. Plates 6, attached to the side-frames 2, constitute an inclosure for part of a chain-conveyer 7, that runs over idler pulleys 8 at the front end, and over sprockets 9 at the rear end (Fig. 3). The latter are fixed on a shaft 10, that is revolved in the direction of the arrow (Fig. 3) by connection to the shaft 4 through gears 11 and 12, and so drive the conveyer 7. Near the lower end of the side-frames 2 are braces 13, bolted together at 14, and connected by a clevis 15 to a leading-truck 16. Said truck has a pole 17 that carries the draft connections and two wheels 18, 18. The conveyer-belt 7 (Figs. 3 and 7) is composed of two sets of flat links, one on each side, connected transversely by parallel rods 45.

Between the idlers 8 and the driving sprockets 9 before mentioned, are bars 46 (Fig. 3) pivoted to the inside of the frames 2 at 47, and having their rear ends free. The pivot 47 is back of the star wheel 52 mentioned below. The rear ends of said bars 46 rest on one of a series of horizontal pins 48 on the sprocket 9. As the latter revolves, the ends of the bars 46 are lifted by one pin, and then slip off to the next, dropping forcibly thereon, and so shaking the conveyer. This action tends to break up the clods of earth clinging to the vegetables, and it falls through to the ground, while the vegetables remain on the chain and are continuously carried upward. The conveyer-chain is agitated still more forcibly by plates 49, pivoted to the bars 46, and having lugs 50 that engage the rods 45. When said lugs engage said rods, the plates 49 are turned about their pivots, and as they are long and narrow, it follows that they will assume the horizontal position with an abrupt motion after having passed the vertical dead-center. The chain is thus given an additional up-and-down movement. Star-wheels 51 pivoted to the vibrating bars 46, and star wheels 52 on a horizontal shaft 53, accomplish the same result to a less extent, and also serve as supports for the conveyer-chain. The arms of said star-wheels 52 carrying transverse rods 52$^a$, adapted to project up between and above the rods 45, and so to agitate the material carried by the conveyer. The shaft 53 is fixed to the side-frames 2 (Figs. 5 and 6), and as shown in the drawings it carries, near each end, a collar 54 that has lugs 55 on one side. The latter are adapted to enter a slot 56 in said wheel, as shown (Fig. 5), and so permit only concentric rotation. The collar may be removed from the wheel, however, and in this case the latter will rotate eccentrically, because of the slot 56, and thereby agitate the conveyer-chain at its lower end. The star-wheels are revolved by the conveyer-chain as it travels.

It is desirable to disconnect the conveyer driving shaft from the main shaft 4 when the machine is being moved along the ground and is not required for digging. The gears 11 and the ground wheels 5 are loose upon the shaft 4. A ratchet 57, integral with each gear 11, is adapted to be engaged by pawls 58, each of which is pivoted on the wheel 5 and carries a curved spring 59. The latter, to bring the pawls into engagement with the ratchet, have their free ends pressed against projecting lugs 60 on spokes of the wheel 5. If the free ends of the springs are lifted up by hand so as to rest on the outer faces of the lugs, the pawls 58 are disengaged from the ratchet wheels, and the wheels 5 may then turn, without moving the gears 11 and 12, and therefore the conveyer does not move. A seat 94, for the driver, is supported on posts 95, and is conveniently situated for operation of the various levers.

The shaft 4 (see Fig. 2) runs through the bearings 3 and outside said bearings carries the gear wheels 11 and ground wheels 5. Collars 4$^a$ and 4$^b$ are fixed to said shaft, close against the inside of the bearings 3, and the outside of the ground-wheels 5, respectively, and so receive the lateral thrust of the shaft.

What I claim is:—

1. In a digger for peanuts and the like, the combination of side-frames, a plow at their forward ends, an endless conveyer movable backwardly from the plow, means for moving the conveyer continuously, a pair of star-wheels engaging the conveyer, each star-wheel having a slot, and pivotal means, for supporting the star-wheels, attached to the side-frames and lying in said slots.

2. In a digger for peanuts and the like, the combination of side-frames, a plow at their forward ends, an endless conveyer movable backwardly from the plow, means for moving the conveyer continuously, a pair of star-wheels engaging the conveyer, each star-wheel having a slot, pivotal means for supporting the star-wheels, attached to the side-frames and lying in said slots, and collars rotatably mounted on the pivotal means and adapted to fill said slots and restrict the star-wheels to rotary movement.

3. In a digger for peanuts and the like, the combination of side frames, a plow at their forward end and an endless conveyer movable backward from the rear end of said plow and having a supporting portion consisting of cross bars with open spaces between them, means for agitating material carried by said conveyer consisting of a pair of wheels having projecting arms adapted to project between the cross bars, and a series of bars connecting the ends of corresponding arms.

4. In a digger for peanuts and the like, the combination of an endless conveyer consisting of flexible side elements and crossbars connecting said elements and having open spaces between them, means for vibrating the said conveyer in directions transverse to the supporting surface thereof, a pair of wheels having arms projecting through between said cross bars, and rods connecting the ends of corresponding arms for raising the material from said cross bars and depositing it again thereon, and means for simultaneously operating said conveyer and said means for vibrating it.

WILLIAM H. RICE.

Witnesses:
D. GURNEE,
L. THON.